(12) United States Patent
Chen

(10) Patent No.: US 8,655,172 B2
(45) Date of Patent: Feb. 18, 2014

(54) SYSTEM AND METHOD FOR OBTAINING OPTICAL SIGNAL INFORMATION

(75) Inventor: David Zhi Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1314 days.

(21) Appl. No.: 11/543,472

(22) Filed: Oct. 5, 2006

(65) Prior Publication Data

US 2010/0142941 A1   Jun. 10, 2010

(51) Int. Cl.
*H04J 14/00*   (2006.01)
*H04B 10/08*   (2011.01)

(52) U.S. Cl.
USPC .................................. 398/57; 398/32; 398/33

(58) Field of Classification Search
USPC ........... 398/25, 32, 183, 33, 57; 370/254, 255
See application file for complete search history.

(56) References Cited

U.S. PATENT DOCUMENTS

| | | | |
|---|---|---|---|
| 6,101,012 A * | 8/2000 | Danagher et al. ................. 398/1 |
| 6,704,508 B1 * | 3/2004 | Asahi ............................... 398/30 |
| 7,016,607 B1 * | 3/2006 | Carrick et al. ................... 398/32 |
| 7,197,243 B1 * | 3/2007 | Harley et al. .................... 398/32 |
| 7,286,755 B1 * | 10/2007 | Goodwill et al. ................ 398/26 |
| 2001/0017729 A1 * | 8/2001 | Sugaya et al. ............ 359/341.41 |
| 2001/0040710 A1 | 11/2001 | Sharratt et al. |
| 2001/0048538 A1 | 12/2001 | Kowalski |
| 2002/0109879 A1 | 8/2002 | Wing So |
| 2003/0007220 A1 * | 1/2003 | Whittlesey et al. ............ 359/167 |
| 2003/0016411 A1 * | 1/2003 | Zhou et al. ..................... 359/110 |
| 2003/0099010 A1 * | 5/2003 | Liu et al. ........................ 359/110 |
| 2003/0103252 A1 * | 6/2003 | Liu et al. ........................ 359/110 |
| 2003/0138251 A1 | 7/2003 | Jayaram et al. |
| 2006/0171717 A1 * | 8/2006 | Kikuchi .......................... 398/83 |

OTHER PUBLICATIONS

"Determine", http://www.merriam-webster.com/dictionary/determine, Retrieved Jul. 28, 2013, Merriam-Webster, pp. 1-4.*
"Electrical Engineering Training Series, Radio Waves", http://www.tpub.com/neets/book10/40a.htm, Retrieved Jul. 28, 2013 via web.archive.org, Published May 11, 2005, Integrated Publishing, pp. 1-4.*
"Wavelength Tracker", Tropic Networks Inc., 2006, http://www.tropicnetworks.com/template.php?unique=60.

* cited by examiner

*Primary Examiner* — Daniel Dobson

(57) ABSTRACT

A system is provided for identifying signal propagation information. The system includes at least one component configured to receive an optical input signal and to emit an optical output signal. The emitted optical output signal is representative of the optical input signal, and is associated with characteristic information indicative of the component. A processor is also included, the processor being configured to sense the optical output signal and correlate the characteristic information with said component.

17 Claims, 3 Drawing Sheets

SYSTEM AND METHOD FOR OBTAINING OPTICAL SIGNAL INFORMATION

BACKGROUND INFORMATION

Figure 1:
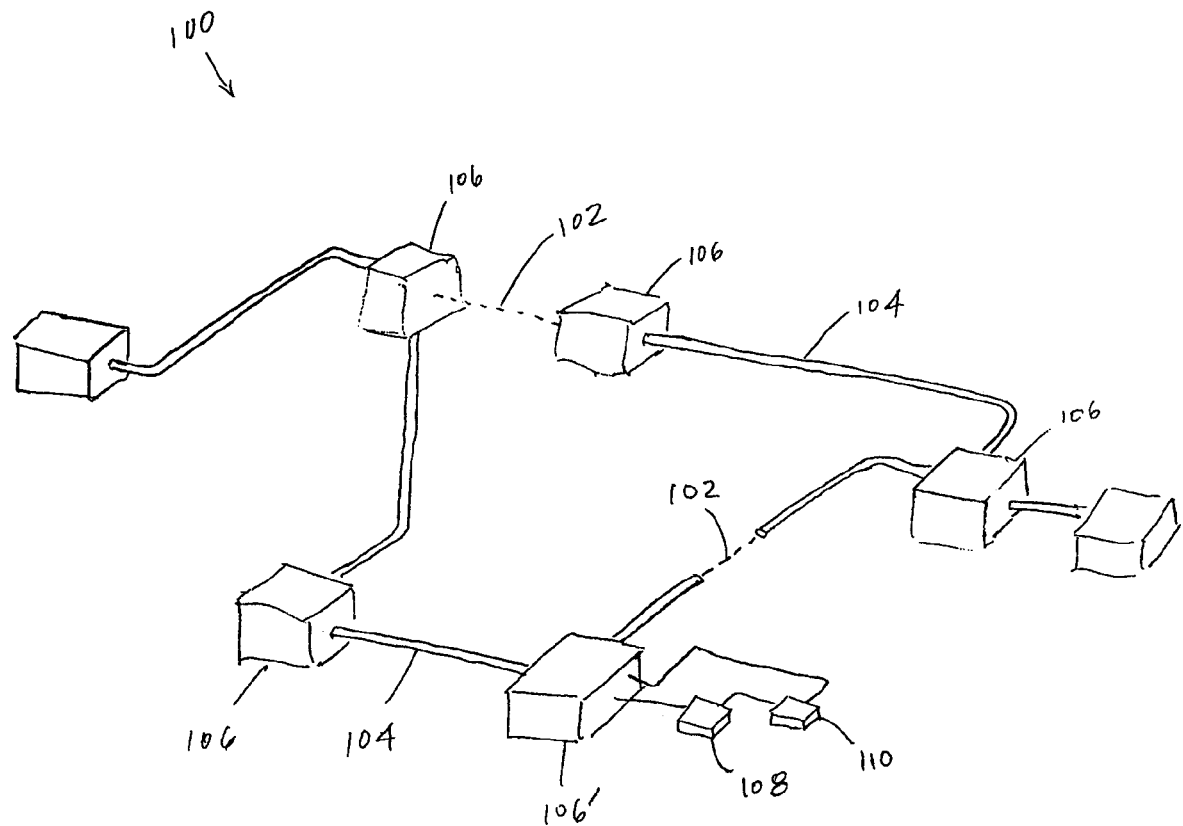

Optical networks are increasingly relied upon for communications and data transfer activities. However, while many data transfer activities involve communications across large geographical distances, the spatial expanse of "proprietary networks," or those networks controlled by individual network providers, is often somewhat more limited. As a result, some network providers have sought to implement a system in which each network provider shares access to its own proprietary network, or "domain," with other network providers. In that case, optical signals would be passed from one domain to another, thereby expanding the spatial communications capabilities of all users. By employing such a system, network providers hope to enable national and international communications services in line with customer demands.

One of the significant obstacles to the above system of network sharing is ensuring network interoperability, or the ability of one domain to effectively receive, process, and/or propagate optical signals from another domain. Specifically, in many cases, network providers are related to the communications service providers, and the various domains are configured to be consistent with specific communications methods and protocols. Components included in the network forming each domain, while well-suited for handling intra-domain optical signals, are often ill-suited to interacting with inter-domain optical signals, due to an inability to recognize degradation of the signals. Until recently, solutions to this issue focused on mainly software-implemented strategies to allow optical signals to be recognized by different domains. However, software solutions have failed to completely solve the problem, due to the requirement to reveal proprietary network information in order to create the software. As such, there is a need for an optical communications system in which domain interoperability is enhanced.

BRIEF DESCRIPTION OF THE SEVERAL VIEWS OF THE DRAWING(S)

Figure 2A:
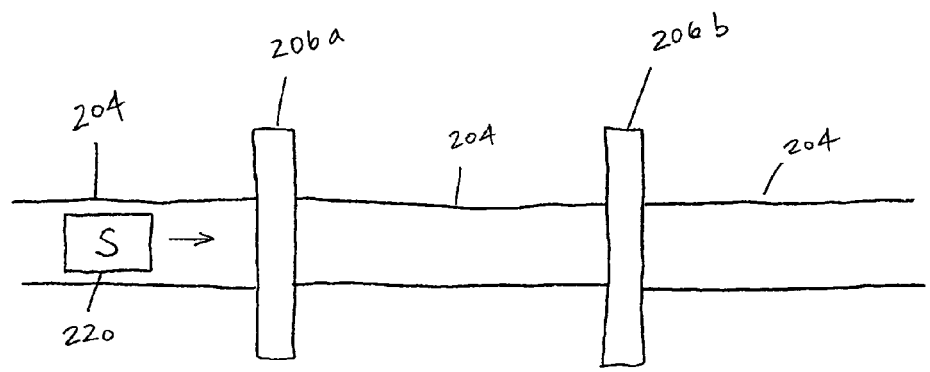
Figure 2B:
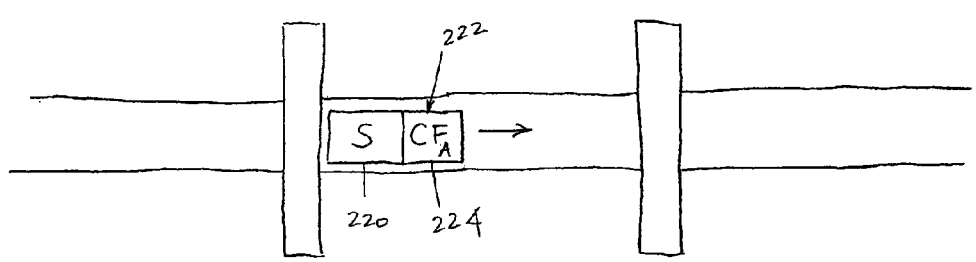
Figure 2C:
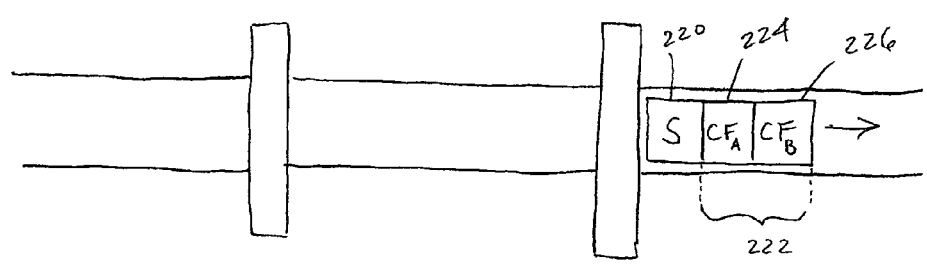
Figure 3:
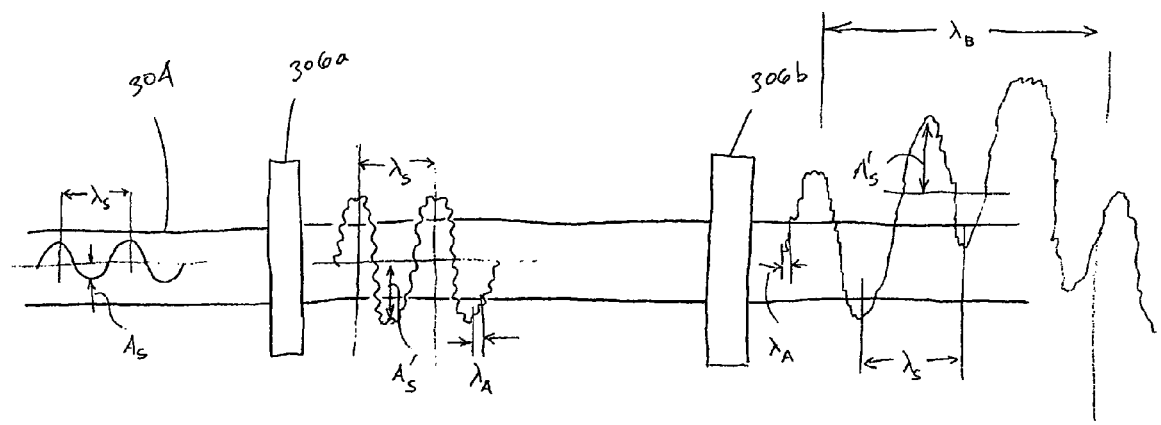

FIG. 1 is a schematic perspective view of a portion of an optical network, the network being configured in accordance with an embodiment of the present invention;

FIGS. 2a-2c are a sequential schematic representation of a signal s propagating along a wave guide connecting several components that introduce characteristic information associated with the signal; and FIG. 3 is a schematic representation of a signal propagating along a wave guide, the signal being shown at three sequential points in time including before encountering several optical network component and after encountering one and both of the components.

DETAILED DESCRIPTION OF PREFERRED EMBODIMENTS

The preferred embodiments according to the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, therein is shown a portion of an optical network 100, the illustrated portion being configured in accordance with an embodiment of the present invention. The network portion 100 includes multiple optical paths, such as free-space areas 102 for propagation of optical or electromagnetic waves and discrete waveguides 104, such as optical fibers. Both the free-space links 102 and the wave guides 104 are capable of supporting the propagation of signals. The network portion 100 may be part of a larger network, or may be independently utilized. If the network portion is part of a larger network, that larger network may be exclusively optical, may include electrical and optical aspects, may utilize only electrical components that couple to the illustrated network portion via an electrical-to-optical converter, or may include aspects that support the propagation of other types of signals, such as, for example, pressure or stress waves.

Multiple components 106 may be included in the network portion 100, interconnected by the optical paths 102, 104. When the components 106 are connected in this way, signals may propagate between the components and along and through the network portion 100. Each of the components 106 can be configured to receive an input signal propagating on an optical path and to emit an output signal. At least some of these output signals can be representative of the input signals, such that information contained in the input signal is generally retained and further propagated in the related output signal; an example of such a representative output signal is described in more detail below. Some output signals may also be associated with characteristic information that includes characteristic features indicative of the subset of components 106 that has been encountered by the signal (i.e., the signal that generated the output signal) during propagation through the network portion 100. Examples of characteristic information and characteristic features are also included below. In some embodiments, characteristic information might also include information regarding the content or format of the signal. For example, some of the characteristic information might indicate the wavelength of an associated optical signal.

Network portion 100 also includes a processor 108 configured for obtaining characteristic information and correlating such information, respectively, with one or more of the components 106. As used herein, processor 108 is to be broadly construed to include any type of computing device or other hardware or software component capable of performing the functions described below in conjunction with the processor. In terms of obtaining the characteristic information, the processor 108 may be coupled to an optical path, typically via an optical-to-electrical converter, and incorporate the capability to sense signals and associated characteristic information, may be in communication or integrated with a component 106, or may be coupled to another device that is capable of sensing a signal and/or associated characteristic information and relaying such information to the processor 108. A memory 110 can also be included in the network portion 100, memory 110 being in communication with processor 108. For example, memory 110 could store and communicate to the processor 108 a signal and associated characteristic information. The memory 110 could also store instructions or software that cause the processor to obtain the signal and associated characteristic information, either from the memory or otherwise, as well as instructions causing the processor to correlate the characteristic information with at least one component.

By correlating the characteristic information with at least one of the respective components, processor 108 might determine one or all of the components 106 that a signal has encountered while propagating on network portion 100. Processor 108 might also determine the path followed by the signal in traversing the network portion 100, as well as the actual or likely signal intensity and/or degradation due, for example, to dissipation in the components encountered and/or the wave guides. In some embodiments, multiple processors may be included in the network portion, perhaps by coupling a respective processor to each, or at least a plurality, of the components. The inclusion of multiple processors might allow for analyzing signals throughout significant portions, if not all, of the network portion. In some cases, the processor may be configured to correlate the characteristic information associated with a signal with substantially all of the respective components that the signal has encountered. This configuration might facilitate the tracing of a signal through a network being traversed by the signal.

As mentioned, processor 108 may be employed to determine the intensity of a signal based on the characteristic information. Along these lines, the processor 108 may be configured to determine the intensity of a signal reaching a specific component. The processor can then instruct the component associated with the processor, such as component 106' in FIG. 1, to dispose of the signal in an appropriate manner based on the intensity of the signal. For instance, if the signal intensity is low, the processor can instruct the component to emit a related output signal, for example, by emitting an amplified version of the input signal, for further propagation through the network portion. Conversely, if signal intensity is high, the processor may instruct the component to simply transmit the signal. In some cases, the processor may instruct the component to terminate the signal. This can involve communicating the content of the signal to a separate device, such as a monitor for displaying the content or a cellular phone for receiving the content.

Referring to FIGS. 2a-2c, therein are shown sequential schematic representations of a signal s 220 propagating along a wave guide 204 connecting several components 206a-b. First, signal (s) 220 is shown propagating along a waveguide 204 toward a component 206a. Once signal 220 encounters component 206a, characteristic information 222 is introduced such that the characteristic information 222 is associated and travels with signal 220. The characteristic information 222 includes characteristic feature (CF$_a$) 224 indicative of the fact that signal 220 has encountered component 206a. As signal 220 and characteristic information 222 continue to propagate along waveguide 204, component 206b is encountered. As a result, characteristic feature (CF$_b$) 226 is introduced such that it is associated and travels with signal 220. Characteristic feature 226 is indicative of the fact that the signal 220 has encountered component 206b. As shown in FIG. 2c, the output signal from component 206b not only includes signal (s), but also both CF$_a$ and CF$_b$ such that any subsequent analysis of the output signal can determine that the path of the signal (s) included components 206a and 206b as a result of the inclusion of CF$_a$ and CF$_b$, respectively.

Various types of components might be included in the network portion discussed above. For example, network components can include tunable optical devices, such as reconfigurable optical add/drop multiplexers (ROADM). Components can also include transponders, optical amplifiers, waveguides, lenses, beam splitters, and mirrors. Specifically, dithering functions, such as those sometimes employed in conventional networks and facilitated by transponders and/or mirrors, can serve to incorporate characteristic features into a propagating signal. By using a specific dithering tone for each transponder or for related groups of transponders, a signal can incorporate a set of characteristic features indicative of the path followed by the signal through the network portion.

Components can be configured to introduce characteristic feature such that each component introduces a unique characteristic feature. In this way, a processor might track the exact components encountered by a propagating signal. Alternatively, components may introduce characteristic features that are indicative of a type of component, a spatial location, or the owner/operator of the equipment, but which are not necessarily unique to one component. In this case, a processor may be able to generally determine the origin, path, and/or distance traveled by a signal in a network, although it may still be possible to determine an exact signal route based on correlations between intensity and characteristic information. Moreover, by appending the characteristic features in a predefined order, the processor can also determine the corresponding order in which a propagating signal encountered the components. This may also be possible when the characteristic features are not specified in a predefined order, through de-convolution techniques.

As an example of the manner in which characteristic information might be associated with a signal, referring to FIG. 3, therein is shown a schematic representation of a signal propagating along a wave guide 304. The signal is shown at three sequential points in time, from time $t_0$ where the signal is approaching component 306a to a time $t_1$ where the signal is beyond component 306a and approaching component 306b, and then to a time $t_2$ where the signal has passed component 306b. At $t_0$, the signal can be represented by a sinusoidal wave with a wavelength of $\lambda_s$ and an amplitude of $A_s$. This, for instance, is the response over time sensed by a receiver of the signal.

At a time between $t_0$ and $t_1$, the signal encounters component 306a. Once the signal has encountered component 306a at $t_1$, the amplitude of the original sinusoid is increased to $A_s'$ while the wavelength has remained at $\lambda_s$. As such, the component 306a has amplified the original signal, but has emitted a signal that is representative of the original (in this case, has the same wavelength $\lambda_s$). Component 306a has also acted to superimpose or modulate another wave onto the original sinusoid. The superimposed wave has a wavelength $\lambda_a$ and is aggregated with the original wave to yield a composite wave characterized by the waveform shown at $t_1$. This superimposed wave may act as the characteristic feature of component 306a, being indicative of the interaction between the signal and the component.

As the signal continues to propagate along wave guide 304, the signal encounters at a time between $t_1$ and $t_2$ the component 306b. Following this encounter at $t_2$, another wave has been superimposed onto the signal. The newly superimposed wave has a wavelength of $\lambda_b$. The superposition yields a composite wave that may be represented by the waveform shown at $t_2$. Still contained by the composite wave is a component with amplitude of $A_s'$ and a wavelength of $\lambda_s$. This composite wave, therefore, continues to be representative of the original signal, although amplified. Further, the wave now includes a component with a wavelength $\lambda_b$, and this may act as the characteristic feature of the component 306b.

As mentioned, the waveform representing the signal at time $t_2$ includes several different harmonic frequencies which act as the characteristic features. In one embodiment, the characteristic features can be extracted by performing a frequency transformation on the wave to separate the components of different wavelength, as is well known. This transformation can be carried out, for example, by a processor, perhaps in a conventional computer. Alternatively, components can be used for physically separating the signal from the characteristic information, perhaps by employing a band pass filter that allows transmission of the signal but not the other components of the propagating wave. In instances in which it is desirable to be able to individually identify the components through which the signal passed, the wavelengths $\lambda_a$ and $\lambda_b$ that are superimposed upon the signal may be unique to and, therefore, characteristic of components 306a and 306b.

The characteristic information can be introduced such that the information leads, trails, or is commingled with the signal, or could be some combination thereof. In some embodiments, at least one of the signals may be included in an electromagnetic wave. In these cases, characteristic features may be introduced in the form of electromagnetic radiation of one or more wavelengths. In one embodiment, one component may be a transponder that introduces electromagnetic radiation of one or more wavelengths via a dithering tone of the transponder. Dithering may be amplitude dithering, frequency dithering, or a combination of the two. Signals and characteristic information can be amplitude modulated, frequency modulated, or a combination.

Many modifications of the preferred embodiments set forth herein and other embodiments will be evident based on the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   receiving, by a network device, a propagating optical signal that has propagated through a plurality of optical network components of an optical network;
   extracting by the network device, characteristic information from the propagating optical signal;
   identifying, by the network device, the extracted characteristic information associated with the propagating optical signal,
      the characteristic information being introduced by at least two optical network components of the plurality of optical network components encountered by the propagating optical signal, and
      the characteristic information including:
         a first wave superimposed on the propagating optical signal by a first component of the at least two optical network components, and
         a second wave superimposed on the propagating optical signal by a second component of the at least two optical network components;
   correlating, by the network device, the characteristic information with the at least two optical network components encountered by the propagating optical signal,
      the correlating including:
         determining that a network path through which the propagating optical signal has propagated includes the at least two optical network components, and
         determining, based on the first wave and the second wave of the characteristic information, an order in which the propagating optical signal encountered at least the at least two optical network components;
   determining, by the network device and based on the characteristic information, an intensity of the propagating optical signal; and
   outputting, based on the intensity and from the network device, an optical signal that is based on the propagating optical signal,
      an amplification of the outputted optical signal being based on the intensity of the propagating optical signal.

2. The method according to claim 1,
   where the propagating optical signal is incorporated into a wave, and where extracting
   the characteristic information includes:
      performing a frequency transformation on the wave to identify the characteristic information.

3. The method according to claim 1, where determining the intensity includes:
   determining, based on correlating the characteristic information with the at least two optical network components, the intensity of the propagating signal.

4. The method according to claim 3, where the first wave is introduced by and unique to the first component of the at least two optical network components.

5. The method of claim 1,
   where the first wave has a first wavelength, and
   where the second wave has a different second wavelength.

6. The method of claim 1,
   where the outputted optical signal includes an amplified version of the propagating optical signal when the intensity of the propagating optical signal is lower than a threshold intensity.

7. The method of claim 1, where the outputted optical signal includes a non-amplified version of the propagating optical signal when the intensity of the propagating optical signal is higher than a threshold intensity.

8. The method of claim 1, further comprising:
   outputting content of the optical signal to at least one of:
      a display device, or
      a cellular telephone.

9. The method of claim 1, further comprising:
   correlating the intensity with the characteristic information.

10. A system that includes a plurality of optical components, the system comprising:
    a processor to:
       sense a propagating optical signal encountered by at least two optical components of the plurality of optical components,
       identify characteristic information associated with the propagating optical signal,
          the characteristic information including:
             a first wave superimposed on the propagating optical signal by a first component of the at least two optical components, and
             a second wave superimposed on the propagating optical signal by a second component of the at least two optical components,
       correlate the characteristic information with the at least two optical components,
       when correlating the characteristic information, the processor is to:
          determine, based on the first wave and the second wave of the correlated characteristic information, an order of optical components, of at least the at least two optical components, through which the propagating optical signal has propagated,
       determine, based on the correlated characteristic information, an intensity of the propagating optical signal, and
       output an optical signal that is based on the intensity of the propagating optical signal, an amplification of the outputted optical signal being based on the intensity of the propagating optical signal.

11. The system according to claim 10, where the first component includes at least one of a transponder, an optical amplifier, a mirror, or a tunable optical component.

12. The system according to claim 10,
where the first component includes a tunable optical component, and
where the tunable optical component includes a reconfigurable optical add/drop multiplexer (ROADM).

13. The system according to claim 10, where the processor is further to:
correlate the characteristic information with a wavelength of at least one of an input signal or an output signal associated with the first component.

14. An apparatus comprising:
a memory to store executable instructions; and
a processor to execute the executable instructions to cause the processor to:
receive an optical signal,
identify characteristic information associated with the optical signal, the characteristic information being introduced by at least two optical network components encountered by the optical signal, and
the characteristic information including:
a first wave superimposed on the optical signal by a first component of the at least two optical network components, and
a second wave superimposed on the optical signal by a second component of the at least two optical network components,
correlate the characteristic information with the at least two optical network components,
when correlating the characteristic information, the processor is to:
determine, based on the first wave and the second wave of the characteristic information, an order in which the optical signal encountered at least the at least two optical network components, and
determine a network path based on the order,
determine, based on the correlated characteristic information, an intensity of the optical signal, and
output another optical signal that is based on the intensity of the optical signal,
an amplification of the other optical signal being based on the intensity of the optical signal.

15. The apparatus according to claim 14,
where the optical signal is incorporated into a wave, and
where, when identifying the characteristic information, the processor is to:
extract the characteristic information by performing a frequency transformation on the wave to identify the characteristic information.

16. The apparatus according to claim 14, where the first wave is introduced by and is unique to the first component.

17. The apparatus according to claim 14, where the processor is further to:
generate an instruction regarding disposition of the optical signal based on the correlating of the characteristic information with the at least two optical network components.

* * * * *